US 6,587,524 B2

(12) United States Patent
Doetsch et al.

(10) Patent No.: US 6,587,524 B2
(45) Date of Patent: Jul. 1, 2003

(54) RECEPTION METHOD AND RECEIVER FOR MOBILE RADIOTELEPHONE APPLICATIONS

(75) Inventors: Markus Doetsch, Schliern (CH); Peter Jung, Otterberg (DE); Jörg Plechinger, München (DE); Peter Schmidt, Erpolzheim (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 10/017,637

(22) Filed: Nov. 21, 2001

(65) Prior Publication Data

US 2002/0163978 A1 Nov. 7, 2002

Related U.S. Application Data

(63) Continuation of application No. PCT/DE00/01612, filed on May 19, 2000.

(30) Foreign Application Priority Data

May 21, 1999 (DE) .......................................... 199 23 407

(51) Int. Cl.$^7$ .............................. H04B 1/10; H03H 7/30
(52) U.S. Cl. ........................................ 375/350; 375/229
(58) Field of Search ................................ 375/350, 316, 375/229, 232, 233, 364; 708/322, 323; 333/28 R

(56) References Cited

U.S. PATENT DOCUMENTS 6,307,901 B1 * 10/2001 Yu et al. ...................... 375/341

6,513,140 B2 * 1/2003 Dotsch et al. ............... 714/786

FOREIGN PATENT DOCUMENTS

| EP | 0 866 568 A1 | 9/1998 |
| WO | WO 96/11533 | 4/1996 |

OTHER PUBLICATIONS

"Interference Suppression by Joint Demodulation of Chochannel Signals" (Ranta et al.), Nokia Research Center, pp. 153–187.
"Co–Channel Interference Cancelling Receiver for TDMA Mobile Systems" (Ranta et al.), Proceedings of the International Conference on Communications New York, IEEE, Jun. 18, 1995, pp. 17–21.
"Combined Turbo Equalization and Turbo Decoding" (Raphaeli et al.), IEEE Communication Letters, IEEE Service Center, vol. 2, No. 4, Apr. 1, 1998, pp. 107–109.
"Combined Multiuser Reception and Channel Decoding for TDMA Cellular Systems" (Valenti et al.), IEEE, vol., Conf. 48, May 18, 1998, pp. 1915–1919.

* cited by examiner

Primary Examiner—Khai Tran
(74) Attorney, Agent, or Firm—Laurence A. Greenberg; Werner H. Stemer; Ralph E. Locher

(57) ABSTRACT

In a receiving method for mobile radio applications, a given user data signal and at least one further user data signal located within the same frequency band are received. These two user data signals are equalized with an adaptive multiuser data detector and with a multiuser channel decoder that is connected in the feeback path to the adaptive muliuser data detector. Noise-reduction in the given user data signal is achieved by taking into consideration, during channel decoding, an extrinsic information item generated during source decoding.

9 Claims, 4 Drawing Sheets

RECEPTION METHOD AND RECEIVER FOR MOBILE RADIOTELEPHONE APPLICATIONS

CROSS-REFERENCE TO RELATED APPLICATION

This application is a continuation of copending International application PCT/DE00/01612, filed May 19, 2000, which designated the United States.

BACKGROUND OF THE INVENTION

Field of the Invention

The invention lies in the communications field and relates, more specifically, to a receiving method and a receiving device for use in mobile radio systems.

In cellular mobile radio systems, the geographic region which is to be supplied with radio communication is divided into cells. The reason for the cellular division is not only the attempt to supply the widest possible region (cellular network) with radio communications but also to provide for a high number of users (capacity) of the cellular network, which has a limited total transmission bandwidth, by means of so-called frequency reuse.

The principle of frequency reuse means that certain cells of the cellular network (which should be as far apart as possible) use the same frequency subband of the total transmission bandwidth. Each frequency subband, in turn, is subdivided into a number of user channels. The superimposition of signals coming from users who are active in the same channel in these cells having the same frequency subbands ("common-channel cells") is called cochannel interference.

In cellular mobile communication systems without band spreading (i.e. systems which do not use CDMA (code division multiple access) methods such as, for example, GSM (global system for mobile communications), cochannel interference is disadvantageous because it does not only impair the quality of service but, as a rule, also limits the capacity of the cellular network.

In Chapter 2 "Interference suppression by joint demodulation of cochannel signals", written by P. A. Ranta, M. Pukkila, of the book "GSM—Evolution towards $3^{rd}$ Generation Systems" by Z. Zvonar, P. Jung and K. Kammerlander (publisher), Boston, 1999, pages 153–86, it is proposed to use the method of joint detection, also referred to as "JD", which, in the text which follows, is also referred to as multiuser detection for suppressing the cochannel interference.

In the article "Combined Turbo Equalization and Turbo Decoding" by D. Raphaeli and Y. Zarai, IEEE Communications Letters, Vol. 2, No. 4, 1998, pages 107–09, an iterative receiving method is described. An MAP (maximum a posteriori) symbol estimator is used for adaptive channel estimation and a turbo decoder following the MAP symbol estimator is used for decoding. The MAP symbol estimator and the turbo decoder are arranged in a feedback-loop and perform an iterative single-user equalization.

In the document "Combined Multiuser Reception and Channel Decoding for TDMA Cellular Systems" by M. C. Valenti et al., Ottawa, Canada, May 18–21, 1998, New York, N.Y.: IEEE, US, Vol. CONF. 48, May 18, 1998 (1998-05-18), a multiuser receiving method is described, wherein an iterative equalization is performed by means of a loop consisting of a multiuser data detector and a channel decoder.

European patent application EP 0 866 568 A1 describes a multiuser receiving method wherein a number of receiving antennas are used for signal reception. This provides for directionally selective detection of the received data.

SUMMARY OF THE INVENTION

It is accordingly an object of the invention to provide a reception method and a receiver for mobile radio applications, which overcome the above-mentioned disadvantages of the heretofore-known devices and methods of this general type and which create an efficient receiving method and an efficient receiving device for a mobile radio system which does not use a CDMA multiple access method. In particular, it should be possible to achieve coverage for a high number of users, i.e. capacity.

With the foregoing and other objects in view there is provided, in accordance with the invention, a receiving method for mobile radio applications, which comprises the following steps:

receiving a given user data signal (i.e., a signal transmitted by a certain user or a signal intended for a certain receiving user) and at least one further user data signal within a same frequency band;

source decoding the received signal and generating an extrinsic information item;

iteratively equalizing the given user data signal and the further user data signal with an adaptive multiuser data detector and with a multiuser channel decoder connected via a feedback path to the adaptive multiuser data detector;

and thereby effecting a noise reduction in the iteratively equalized given user data signal by taking into consideration the further user data signal, and utilizing the extrinsic information item during channel decoding.

In accordance with another feature of the invention, turbo decoding is performed in the multiuser channel decoding.

With the above and other objects in view there is also provided, in accordance with the invention, a receiving device for mobile radio communications, comprising:

a radio-frequency stage for receiving a given user data signal (i.e., a signal transmitted by a certain user or a signal intended for a certain receiving user) and at least one further user data signal located within the same frequency band as the given user signal; and an iterative equalizer connected to the radio-frequency stage and adapted to equalize the given user data signal and the further user data signal, the iterative equalizer including an adaptive multiuser data detector and a multiuser channel decoder connected in a feedback path to the adaptive multiuser data detector, and the iterative equalizer being configured to utilize in a channel decoding operatin an extrinsic information item generated during source decoding.

In accordance with a further feature of the invention, the adaptive multiuser data detector is configured to perform coherent data detection.

In accordance with a concomitant feature of the invention, the adaptive multiuser data detector is configured to perform, with respect to a user data signal, a channel estimation for a plurality of data signals provided by a plurality of spatially separate receiving sensors.

By combining the principle of multiuser detection with an iterative equalization, two complementary techniques for improving the signal-to-noise ratio are combined. While the multiuser detection is based on considering a part of the cochannel interference as useful signal, i.e. detecting it selectively and then eliminating it from the certain user data signal which is actually of interest (this is possible because the cochannel interference is deterministic in its nature), the iterative equalization is based on the principle of achieving error reduction by utilizing decoded information during the data detection. The latter is done by way of repeated feedback of reliability information, obtained during the multiuser decoding, into the multiuser data detector. The iterative equalization for error reduction is perfoxmed both on the certain user data signal, i.e. the "actual" useful signal, and on the other user data signal, i.e. the cochannel interference signal components treated as useful signal during JD as a result of which these two principles (multiuser detection and iterative equalization) mutually influence and support one another. To improve the results obtained during the iterative equalization an extrinsic information item generated during a source decoding is also used.

In accordance with an added feature of the invention, coherent data detection is performed in the iterative multiuser equalization. In other words, during the iterative equalization, a coherent data detection is preferably performed. A coherent data detection further increases the noise immunity which can be achieved by means of the receiving method according to the invention (or, respectively, the noise immunity of the receiving device according to the invention).

In accordance with an additional feature of the invention, a plurality of data signals received from spatially separate receiving sensors are taken into consideration in the adaptive multiuser data detection. The spatial separation of the receiving sensors has the effect that the individual data signals are transmitted via different transmission channels having (more or less, depending on the distance of the receiving sensors) different transmission characteristics, i.e. having different impulse responses. Taking into consideration a number of such data signals from spatially separate receiving sensors for a user data signal makes it possible to further increase the fault tolerance of the data detection.

Other features which are considered as characteristic for the invention are set forth in the appended claims.

Although the invention is illustrated and described herein as embodied in reception method and receiveer for mobile radiotelephone applications, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
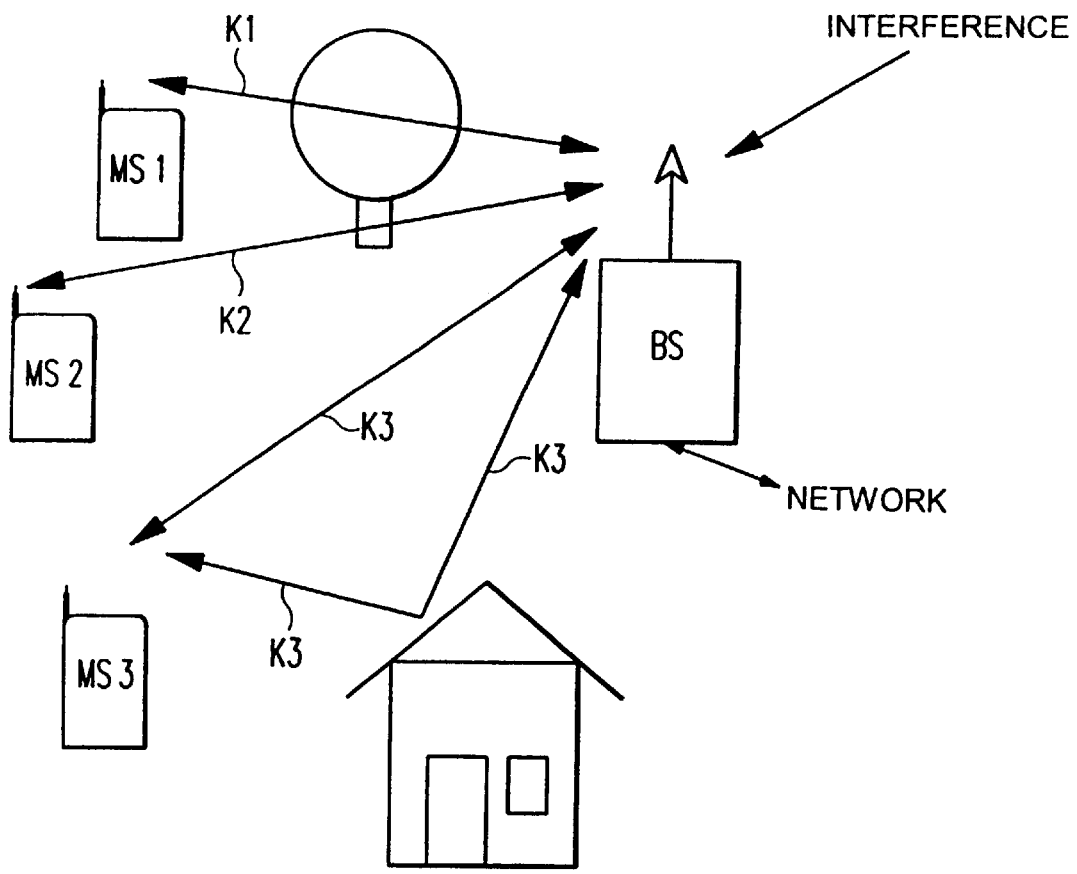
FIG. 1 is a diagrammatic representation of the air interface of a mobile radio system.

Referring now to the figures of the drawing in detail and first, particularly, to FIG. 1 thereof, there is shown a diagrammatic representation of the air interface of a cellular mobile radio system with respect to a single radio cell. Bidirectional communication links can be set up between three mobile stations MS1, MS2, MS3, in each case associated with individual users, and a common base station BS. The respective transmission characteristic of the air interface is described by three radio channels K1, K2, K3.

The communication links between the base station BS connected to a trunk communication network, and the mobile stations MS1, MS2, MS3 are subject to multipath propagation which is caused by reflections, for example on buildings or plants, in addition to the direct propagation path. Assuming that the mobile stations MS1, MS2, MS3 are moving (relative to the stationary base station BS), the multipath propagation, together with other disturbances, leads to the signal components of the various propagation paths of a user data signal becoming superimposed in a time-dependent manner at the receiving station MS1, MS2, MS3 and BS, respectively. The consequence is that the transmission characteristics of the radio channels K1, K2, K3 are continuously changing.

In addition, there is a superimposition of a number of user data signals (i.e. radio signals from or for different users) both in the uplink and in the downlink. The user separation carried out in the receiving devices of the mobile stations MS1, MS2, MS3 and of the base station BS is performed by means of one of the known methods without CDMA component, i.e. for example, FDMA (frequency division multiple access), TDMA (time division multiple access) or a hybrid multiple access method.

Figure 2:
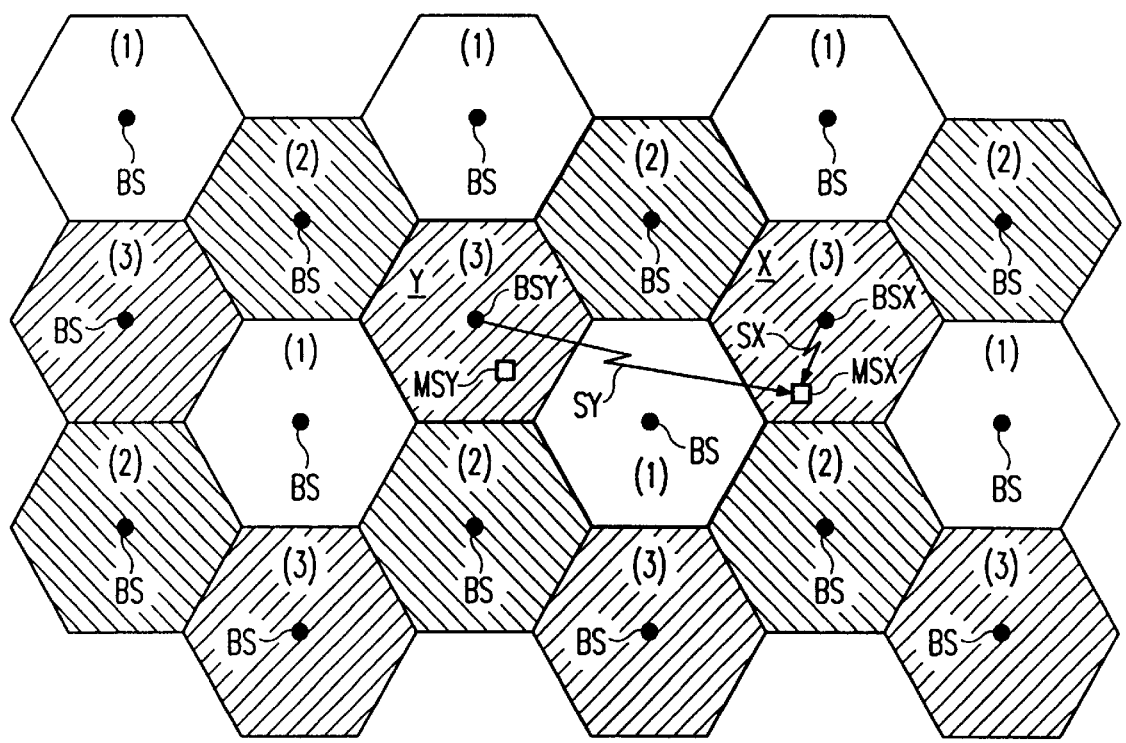
FIG. 2 is a diagrammatic representation of an exemplary cell structure of a cellular mobile radio network.

FIG. 2 illustrates the structure of a cellular network by means of a section of such a network. For the sake of simplicity, hexagonal cells are used as a basis. The base station BS, BSX, BSY belonging to the cell is drawn in the center of each cell. FIG. 2 assumes that the total transmission bandwidth is subdivided into three different frequency subbands. Cells having the same shading and the same bracketed frequency subband identification (1) or (2) or (3), respectively, use the same frequency subband.

As mentioned above, each frequency subband comprises a number of disjoint user channels predetermined by the system specification. The hybrid FDMA/TDMA access method used by GSM, for example, has 124 FDMA user channels in the assigned frequency band. Since also 8 TDMA time slots are provided, a maximum capacity of about 1000 users per radio cell is obtained.

The two mobile stations (users) MSX and MSY are located in two cells X and Y having the same frequency subbands (common-channel cells) and are also active in the same user channel at the same time. Due to the cochannel interference, the quality of service may be impaired for both users MSX and MSY. FIG. 2 illustrates the case of cochannel interference in the downlink. Apart from the user data signal SX originating from the base station BSX (the base station of cell X) and intended for the mobile station MSX, the mobile station MSX also receives a user data signal SY from BSY (the base station of cell Y) intended for the mobile station MSY. Due to the greater distance, between MSX and BSY than between MSX and BSX, however, the latter signal is present with less received energy than SX.

The user data signals SX, SY consist of a sequence of data symbols, some of which are information-carrying data symbols and the remaining part is generally designated as ancillary information-carrying data symbols. In the text which follows the information-carrying data symbols of the user data signal SX radiated by BSX (at the input of the mobile radio channel) will be called dx, and the information-carrying data symbols of the user data signal SY radiated by BSF (at the input of the mobile radio channel) will be called dy.

Figure 3:
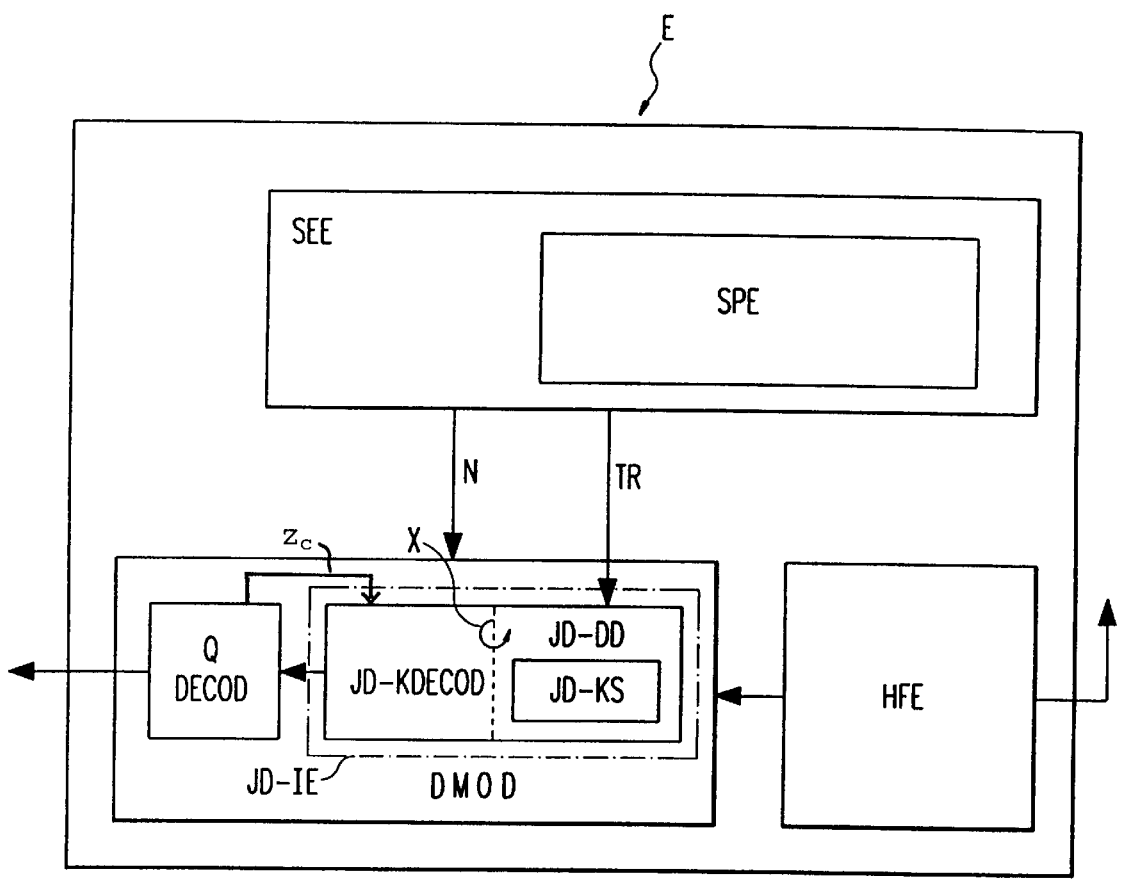
FIG. 3 is a block diagram of a receiving device according to the invention with an iterative multiuser equalizer.

FIG. 3 shows a block diagram of a receiving device E according to the invention. The receiving device E can be located either in a mobile station MS or in a base station BS. In the following text, it is assumed that it is located in the mobile station MSX (unless otherwise specified). The receiving device E contains a high-frequency or radio-frequency receiving stage HFE, control means SEE with a storage device SPE, demodulation means DMOD with a multiuser data detector JD-DD and with a multiuser channel decoder JD-KDECOD and a source decoder QDECOD following the demodulator means DMOD. The multiuser data detector JD-DD is equipped with a multiuser channel estimator JD-KS.

The radio-frequency receiving stage HFE receives via an antenna a radiowave which comprises all user data signals, especially also the user data signal SX (containing the disturbed versions of dx present at the output of the associated channel) intended for the mobile station MSX and the user data signal SY (containing the disturbed versions of dy present at the output of the associated channel) intended for the mobile station MSY. The received signals are limited in bandwidth by an analog filter in the radio-frequency receiving stage HFE and then converted into an analog base band receiving signal (or also intermediate-frequency receiving signal) in the usual manner by down conversions.

The analog base band receiving signal is digitized by an analog/digital converter having a sufficiently high sampling rate corresponding at least to the symbol rate of the data signals and are once again limited in bandwidth by means of a following digital filter.

The bandwidth-limited digital signal thus obtained contains, in addition to the wanted user data signal SX, also the "unwanted" user data signal SY that acts as interference signal and possibly other "unwanted" user data signals present in the frequency band considered. The bandwidth-limited digital signal is supplied to the multiuser data detector JD-DD of the demodulator means DMOD.

In the text which follows, the multiuser detection will be explained by means of a two-user detection for reasons of a simpler illustration, i.e. it is supposed that only one unwanted cochannel interference signal, namely SY, exists.

Using the multiuser channel estimator JD-KS, the multiuser data detector JD-DD performs an adaptive data detection, i.e. one which is adapted to the instantaneous states of the respective transmission channels, for the two user data signals SX and SY.

In detail, this is done as follows: in addition to the information-carrying data symbols dx and dy, special data sequences called training sequences TR, the elements of which (data symbols) are known to the multiuser channel estimator JD-KS, are also transmitted in continual repetition in both user data signals SX and SY. For example, each transmitted data block can contain exactly one training sequence TR. The training sequence TR can be stored in the memory SPE.

By correlating the known training sequence TR with the received disturbed versions of this training sequence TR, the multiuser channel estimator JD-KS calculates with respect to each training sequence TR (i.e. as a rule for each data block) the current channel parameters of the mobile radio channel via which the respective training sequence TR was transmitted.

The channel parameters describe the instantaneous transmission state of the respective mobile radio channel. They can be provided, for example, in the form of sets of parameters which parameterize the functional variation of the channel impulse responses hx and hy respectively. The channel impulse response hx and hy, respectively, is the response of the mobile radio channel at time t to a Dirac pulse fed into the respective channel (the transmission-channel of SX and transmission channel of SY respectively) at t-$\tau$.

After each channel estimation, the channel parameters newly determined are conveyed to the multiuser data detector JD-DD. By convolution of the received versions of the information-carrying data symbols dx and dy, respectively, sent out and unknown to the receiver a priori, with the current channel impulse response hx and hy, respectively (parameterized by the channel parameters), the multiuser data detector determines the reconstructions (referred to as $\hat{d}x$ and $\hat{d}y$ in the text which follows) of the associated transmitted data symbols dx and dy, respectively. A coherent data detection is preferably used. Coherent means that the time-discrete channel impulse responses hx and hy, respectively, are taken into consideration in amount and phase in the adaptive data detection. This presupposes that the multiuser channel estimator JD-KS generates suitable channel parameters which contain corresponding amount and phase information, and that the multiuser data detector JD-DD also uses this information (amount and phase) in the subsequent data detection.

Coherent, adaptive data detection is preferred since it makes it possible to increase the signal/noise ratio in comparison with a non-coherent adaptive data detection.

As already indicated, the block structure of the data symbols must also be taken into consideration in the data detection, i.e. a distinction must be made as to which of the detected data symbols are information-carrying data symbols $\hat{d}x$ and $\hat{d}y$ (i.e. reconstructions of the transmitted information-carrying data signals dx and dy) and which of the detected data symbols are other, ancillary information-carrying data symbols (for example for control information and the like). For this purpose, corresponding information on the block structure used (among other things the number N of data symbols per data block) are stored in the storage means SPE and are conveyed to the demodulator DMOD.

At the output of the multiuser data detector JD-DD, the (reconstructed) digital user data signal is available for the certain user, namely the mobile station MSX considered here, and the (reconstructed) digital user data signal is available to the other user MSY. (If the receiver E is accommodated in the base station BS, a (reconstructed) digital user signal from the certain mobile station MSX and a reconstructed digital user data signal from the other user MSY are available).

The reconstructed information-carrying data symbols ($\hat{d}x$ and $\hat{d}y$ with two-user detection), obtained by the adaptive data detection are generally called $\hat{d}$ in the text which follows. The data symbols d are supplied to the multiuser channel decoder JD-KDECOD.

The looped arrow X indicates that the connection between the multiuser data detector JD-DD and the multiuser channel decoder JD-KDECOD is recursive. This provides for a process called iterative equalization wherein the traditional distinction between data detection and channel decoding is lifted because due to the recursion, one or more repeated data detections take place after the initial channel decoding.

The structure of multiuser data detector JD-DD with multiuser channel estimator JD-KS and multiuser channel decoder JD-KDECOD, bordered with a dot-dashed line, is called iterative multiuser equalizer JD-IE. The iterative equalization is explained in greater detail in FIG. 4.

The data signal output by the iterative multiuser equalizer JD-IE (also called û in FIG. 4) is supplied to a source decoder QDECOD after block deinterleaving (not shown). This source decoder cancels source encoding which was performed at the transmitting end. The source decoder QDECOD outputs a data signal which is a reconstruction of the original source data signal, i.e. a digitized voice signal, video signal or the like. As is not shown in FIG. 3 but explained in greater detail by means of FIG. 4, the source decoder QDECOD also generates a reliability information item which is supplied to the multiuser channel decoder JD-KDECOD.

Figure 4:
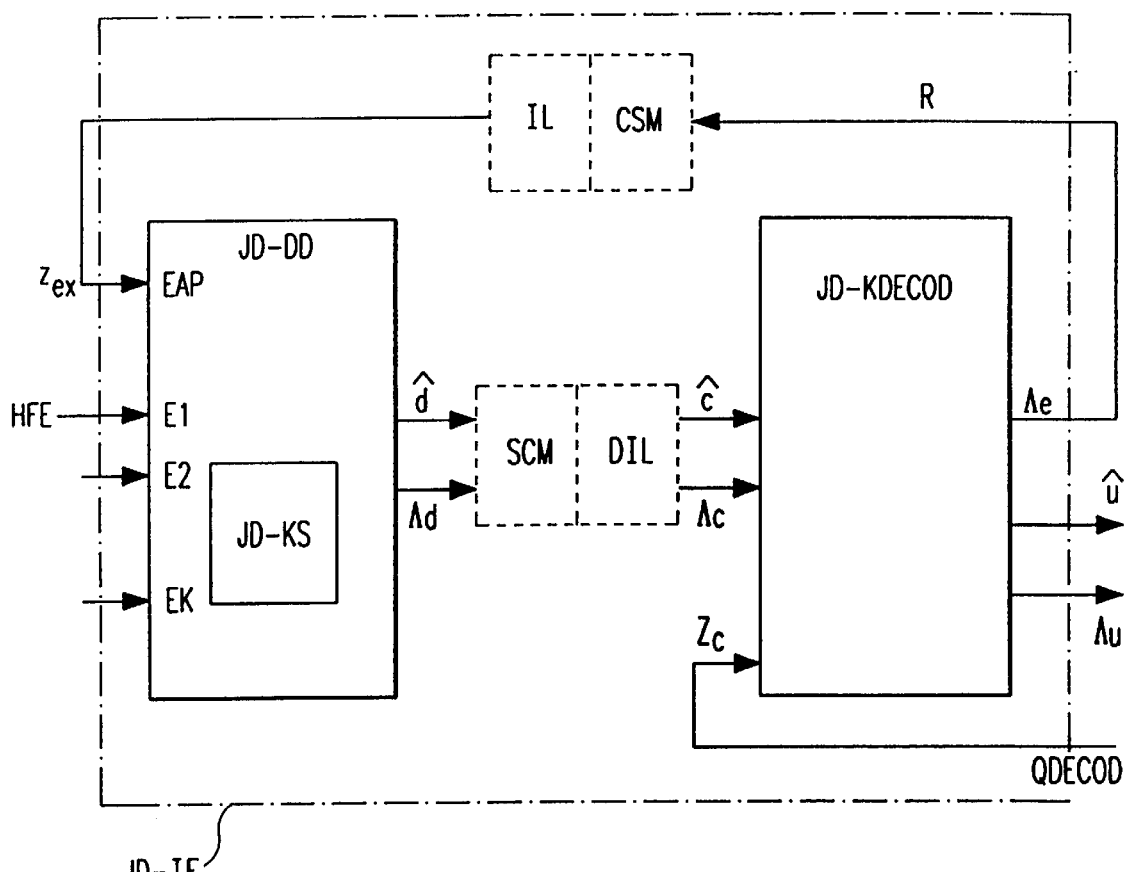
FIG. 4 is a block diagram of the iterative multiuser equalizer shown in FIG. 3.

FIG. 4 shows a block diagram of the iterative multiuser equalizer JO-IE. The multi-user equalizer JD-IE shown in FIG. 4 only differs from the multiuser equalizer JD-IE shown in FIG. 3 in that optionally a number of signal inputs E1, E2, . . . EK are provided which are in each case allocated to different receiving sensors (antennas). This will be explained later; initially, it will be assumed that only one input E1 exists at which the baseband signal output by the radio-frequency receiving stage HFE is present.

FIG. 4 illustrates that a symbol/code bit converter SCM followed by a deinterleaver DIL can be optionally used between the multiuser data detector JD-DD and the multiuser channel decoder JD-KDECOD wherein case a code bit/symbol converter CSM followed by an interleaver IL must be provided in a feedback connection R from the multiuser channel decoder JD-KDECOD to the multiuser data decoder JD-DD.

The iterative multiuser equalizer JD-IE operates as follows:

In addition to the input E1, the multiuser data detector JD-DD has an input EAP for receiving an extrinsic information item which is available to it as a priori knowledge during the data detection. Data detectors which use a priori knowledge about the data symbols to be detected (or about a finite sequence of data symbols to be detected) during the data detection are also called APRI detectors in this field.

The input EAP is connected to the multiuser channel decoder JD-KDECOD supplying the extrinsic information items $z_{ex}$ via the feedback connection R.

The multiuser data detector JD-DD calculates for each detection result d̂ an associated reliability information item $\Lambda_d$. The data sequence and the associated sequence of reliability information items $\Lambda_d$ are provided at an output of the multiuser data detector JD-DD. The sequences d̂ and $\Lambda_d$ are based on the data symbols detected from all received user data signals. For example, the sequence of detected data symbols ^^ (and correspondingly the sequence $\Lambda_d$) can be constructed in such a manner that it alternatingly runs together the detection results of all detected users in serial form, i.e. in the case of a two-user detection, the sequence of detected data symbols d̂ can have the form d̂x, d̂y, d̂x, d̂y.

During the data detection for calculating d̂ and $\Lambda_d$, the multiuser data detector JD-DD uses the extrinsic information items $z_{ex}$ (if this is already available) as a priori knowledge about the transmitted data symbols with respect to all received user data signals SX, SY. During the detection of at least the information-carrying data symbols d̂x of the user data signal SX of interest, it also applies the JD principle, i.e. it reduces the noise of this user data signal SX by eliminating noise components which are attributable to disturbances by the other user data signals (SY) detected for this purpose.

The two data sequences d̂ and $\Lambda_d$ are supplied to the combined symbol codebit converter SCM/deinterleaver DIL and converted into a sequence of binary data ĉ and a sequence of reliability information items $\Lambda_c$ with respect to the binary data ĉ. The sequences ĉ and $\Lambda_c$ are also based on the data symbols detected from all received user data signals. The combined symbol/codebit converter SCM/deinterleaver DIL is optional and is only needed if corresponding binary data have also been used at the transmitting end.

The multiuser channel decoder JD-KDECOD processes the said sequences ĉ and $\Lambda_c$ in such a manner that initially an estimate Q of the (channel) uncoded data sequence of the transmitting end with respect to the user data signal SX and possibly additionally an associated sequence $\Lambda_u$ of reliability information items are output.

In this estimate, the multiuser channel decoder JD-KDECOD uses extrinsic information $z_c$ which is provided to it by the subsequent source decoder QDECOD (FIG. 3) as the result of suitable signal processing.

The multiuser channel decoder JD-KDECOD also determines a sequence of reliability information items $\Lambda_e$, the elements of which essentially represent estimates of the hit or success rate of the preceding data detections with respect to all user data signals SX, SY (i.e. of probability d=d̂ and c=ĉ, respectively. The reliability information items are $\Lambda_e$ converted into the sequence $z_{ex}$, in the combined codebit/symbols converter CSM/interleaver IL.

In the text which follows, one pass through the iteration loop during the iterative equalization is described.

In the first iteration step, there is not yet a sequence $z_{ex}$. Therefore, the multiuser data detector JD-DD initially (i.e. on receiving the user date signals at input E1) operates without taking into consideration a priori knowledge. As already described, the detection results d̂ and $\Lambda_d$ are converted into the sequences ĉ and $\Lambda_c$. The multiuser channel decoder JD-KDECOD, which also has not yet any a priori knowledge (sequence $z_c$), determines in a first estimate values for û, $\Lambda_u$ and $\Lambda_e$. The sequences û, $\Lambda_u$ are supplied to the source decoder QDECOD (see FIG. 3) and the sequence $\Lambda_e$ is supplied (after conversion into the symbol sequence $z_{ex}$ in CSM/IL) to the multiuser data detector JD-DD.

On the basis of the sequences û, $\Lambda_u$ received, the source decoder QDECOD determines the reliability information items $z_c$, and, at the same time, the multiuser data detector JD-DD determines an improved version of the sequences d̂ and $\Lambda_d$ from the sequence already present at input E1 and the extrinsic information items $z_{ex}$ which is now present. These sequences d̂ and $\Lambda_d$, in turn, are converted into improved versions of the sequences ĉ and $\Lambda_c$, in SCM/DIL. The multiuser channel decoder JD-KDECOD processes these improved versions, together with the a priori knowledge $z_c$ which is now also present, to form the improved versions of the sequences û, $\Lambda_u$ and $\Lambda_e$.

Further iteration steps can be performed in accordance with the procedure described.

A measure for improving the quality of reception consists in using signals from a number (K) of antennas.

These can be omnidirectional antennas or antennas with a directional pattern of reception. In the case of a mobile station MSX as receiver, for example, two essentially omnidirectional antennas in the form of the usual rod antenna and a planar antenna attached to the back panel of the housing can be provided. In the case of a base station BS, antennas having a directional pattern of reception are frequently also used instead of omnidirectional antennas.

The baseband signals coming from the K antennas are present at inputs E1, E2, EK. Due to space diversity, a separate transmission channel having its own transmission characteristics is associated with each antenna. In this case, the multiuser channel estimator JD-KS must perform a channel estimation for each input E1, E2, . . . EK and for each detected user data signal SX, SY. In this "multi-antenna detection", the detection gain is based on the "improved statistics when considering K channels (which are independent, if possible) and increases with increasing K.

Many types of modifications of the receiving device E and of the iterative multiuser equalizer JD-IE shown in FIGS. 3 and 4 are possible.

If there is sufficient computing capacity, a turbo decoder can be used as multiuser channel decoder JD-KDECOD. A turbo decoder consists of two individual decoders which are recursively interconnected and perform iterative channel decoding in this manner. When a turbo decoder is used, the iterative channel decoding is performed as subprocess of the iterative equalization described above.

To estimate the channel parameters (i.e. the channel impulse responses hx, hy . . . ), a multiplicity of different algorithms can be used, and especially the algorithms described in the book "Analyse und Entwurf digitaler Mobilfunksysteme [Analysis and design of digital mobile radio systems] by P. Jung, Stuttgart, B. G. Teubner, 1997 in Chapter 5.2.3 on pages 201–206. These algorithms become subject matter of the present application by reference. They are algorithms for signal-adapted filtering, Gaussian estimation, ML estimation, and MAP estimation.

We claim:

1. A receiving method for mobile radio applications, which comprises the following steps:

receiving a given user data signal and at least one further user data signal within a same frequency band;

iteratively equalizing the given user data signal and the further user data signal within an iterative equalizer comprising an adaptive multiuser data detector and a multiuser channel decoder connected via a feedback path to the adaptive multiuser data detector;

during the iterative equalization process, further source decoding a signal output from the iterative equalizer and generating an extrinsic information item; and feeding back the extrinsic information item to the multiuser channel decoder and utilizing the extrinsic information item for multiuser channel decoding within the iterative equalization process, thereby effecting a noise reduction in the iteratively equalized given user data signal.

2. The method according to claim 1, wherein the given user data signal is a signal transmitted by a certain user or a signal intended for a certain receiving user.

3. The method according to claim 1, which comprises performing coherent data detection in the iterative equalization.

4. The method according to claim 1, which comprises taking into consideration a plurality of data signals received from spatially separate receiving sensors in the adaptive multiuser data detection.

5. The method according to claim 1, which comprises performing turbo decoding in the multiuser channel decoding.

6. A receiving device for mobile radio communications, comprising:

a radio-frequency stage for receiving a given user data signal and at least one further user data signal located within a same frequency band; and an iterative equalizer connected to said radio-frequency stage and adapted to equalize the given user data signal and the further user data signal, said iterative equalizer including an adaptive multiuser data detector and a multiuser channel decoder connected in a feedback path to said adaptive multiuser data detector, and said iterative equalizer being configured to utilize in a channel decoding operation an extrinsic information item generated during source decoding received through a feedback from said multiuser channel decoder.

7. The receiving device according to claim 6, wherein the given user data signal is a signal transmitted by a certain user or a signal intended for a certain receiving user.

8. The receiving device according to claim 6, wherein said adaptive multiuser data detector is configured to perform coherent data detection.

9. The receiving device according to claim 6, wherein said adaptive multiuser data detector is configured to perform, with respect to a user data signal, a channel estimation for a plurality of data signals provided by a plurality of spatially separate receiving sensors.

* * * * *